US012759130B2

(12) United States Patent
Fedor

(10) Patent No.: US 12,759,130 B2
(45) Date of Patent: Oct. 13, 2026

(54) LOCKING DEVICE FOR TOOL HANDLE SHAFT AND TOOL BODY

(71) Applicant: Stephen C. Fedor, Mantua, OH (US)

(72) Inventor: Stephen C. Fedor, Mantua, OH (US)

( * ) Notice: Subject to any disclaimer, the term of this patent is extended or adjusted under 35 U.S.C. 154(b) by 345 days.

(21) Appl. No.: 18/415,126

(22) Filed: Jan. 17, 2024

(65) Prior Publication Data

US 2024/0246218 A1 Jul. 25, 2024

Related U.S. Application Data

(60) Provisional application No. 63/440,739, filed on Jan. 24, 2023.

(51) Int. Cl.
*B25G 3/28* (2006.01)
*B25G 3/30* (2006.01)

(52) U.S. Cl.
CPC *B25G 3/28* (2013.01); *B25G 3/30* (2013.01)

(58) Field of Classification Search
CPC ... B25G 3/18; B25G 3/28; B25G 3/30; B25G 3/14; B25G 3/24; B25G 3/36
USPC .................................................. 81/159, 15.9
See application file for complete search history.

(56) References Cited

U.S. PATENT DOCUMENTS 844,130 A * 2/1907 Howard ................ B23B 31/113 403/325
4,224,786 A 9/1980 Langlie et al.
4,293,972 A 10/1981 Pomares
4,406,559 A * 9/1983 Geertsema ............... B25G 3/18 403/287
5,161,278 A 11/1992 Tomm
5,502,862 A 4/1996 Vosbikian
5,890,254 A 4/1999 Courtney et al.
6,219,883 B1 4/2001 Keichline
6,315,488 B1 11/2001 Parker
7,357,593 B1 4/2008 Florence
8,875,350 B2 * 11/2014 Bukovitz .............. C08F 293/00 16/427
10,173,313 B1 * 1/2019 O'Dell ..................... B25G 3/26
2005/0254887 A1 11/2005 Berhoff
2007/0180639 A1 8/2007 Libman et al.
2013/0047796 A1 * 2/2013 Chen ....................... B25F 5/029 81/438

FOREIGN PATENT DOCUMENTS

CH 273355 2/1951
CH 286821 11/1952

* cited by examiner

*Primary Examiner* — Hadi Shakeri
(74) *Attorney, Agent, or Firm* — Hudak, Shunk & Farine Co. LPA

(57) ABSTRACT

A locking device for securing a tool handle shaft to a tool body such as a broom, brush, hoe, rake or shovel that selectively prevents removal of the handle shaft from the tool body utilizing a locking mechanism. The locking mechanism is operatively connected to the tool body and includes a key that is selectively mateable to the keyhole in the handle shaft thereby locking the handle shaft to the tool body.

19 Claims, 9 Drawing Sheets

LOCKING DEVICE FOR TOOL HANDLE SHAFT AND TOOL BODY

FIELD OF THE INVENTION

The present invention relates to a locking device for securing a tool handle shaft to a tool body such as, but not limited to, a broom, brush, hoe, mop, paint roller, rake, shovel or stall pick that selectively prevents removal of the handle shaft from the tool body utilizing a locking mechanism. The locking mechanism is operatively connected to the tool body and includes a key that is selectively mateable to the keyhole in the handle shaft thereby locking the handle shaft to the tool body.

BACKGROUND OF THE INVENTION

Many different sizes, shapes, and the like tool handles are known in the art which are connected to various implements or tools in order to manipulate the latter. Such handles may be straight and cylindrical, or curved or a combination thereof. Handles may also be formed with or provided with a hand grip at one end with a tool or implement connected at the opposite end.

Similarly, many different types of tool bodies are known in the art and also come in a wide variety of sizes and shapes which are dependent at least in part on the tool's function or end use. Example tool bodies include, but are not limited to, brooms, hoes, rakes or shovels.

In some instances, tool handles including a handle shaft are manufactured separately from a tool body. The handle shaft and tool body are connected in an assembly process either by the manufacturer or end user.

In some cases, a part of the handle shaft is formed with threads which mate with complimentary threads within a socket or bore of the tool body. Oftentimes during use, the threaded connection loosens, sometimes to the point of separation of the tool body with the handle shaft.

Still other methods for connecting a tool shaft of a tool handle with a tool body have been proposed in the art in order to prevent separation between the tool body and tool handle including the handle shaft.

Switzerland Patent No. 273355 relates to a handle holder for brooms, scrubbers, downy brushes or similar handle devices.

Switzerland Patent No. 286821 relates to a device for connecting objects.

U.S. Pat. No. 4,224,786 relates to a hand tool with a plastic rake head and a readily removable wooden handle. To reportedly assure retention of the handle, a chordal groove or transverse notch is provided near one end thereof, and the sleeve or socket portion of the rake into which the end of the handle is inserted is provided with a latch mechanism which includes a resilient tongue on the free end of which is carried a dog biased into the groove or notch through an opening in the sleeve so as to releasably latch the handle to the rake head. To prevent twisting of the handle, the bore of the sleeve is formed with a longitudinal key and a keyway is formed in the end portion of the wooden handle. The bore or socket curves inwardly at two angularly spaced locations, one to either side of the longitudinal key, to form resilient ribs having sawtooth splines thereon engageable with the inserted end portion of the handle, there being a slit near one end of such rib so that the ribs can more readily be flexed outwardly to firmly hold handles of somewhat differing diameters, assisted by flat surface ribs located diametrically opposite the ribs with the splines thereon. Various tools of different sizes and types can be substituted one for the other; yet, only a single handle is required.

U.S. Pat. No. 4,293,972 relates to a handle attaching means for brooms and the like consisting of a tubular member having a portion of large diameter for receiving and holding a handle and a portion of reduced diameter for insertion into an opening in a broom, the portion of reduced diameter having openings to receive a bolt which also engages a second opening in the broom to hold the tubular member in engagement therewith.

U.S. Pat. No. 5,161,278 relates to a broom assembly that comprises a head member having an internally threaded handle receiving opening formed therein with a handle connected with the head member by a manually releasable connector assembly positioned between the head member and a first end of the handle. The connector assembly includes an elongated, generally cylindrical connector body having a first end threadedly received in the handle receiving opening in the head member and a second end joined to the first end of the handle. A locking member having a generally annular shape is axially slidable on the connector body with a first end of the member having teeth-like protuberances extending toward the head member. Splines are provided for preventing rotation of the locking member relative to the connector body, and a threaded nut is carried on the connector body for actuating the locking member toward the head to cause the teeth-like protuberances to lockingly engage the head member.

U.S. Pat. No. 5,502,862 relates to a dual function locking bracket for holding and supporting the handle of a push broom or other hand cleaning push tool. The bracket is configured to support the handle in two different positions. For use in transporting and merchandising circumstances, the bracket holds and secures the handle close to the brush or cleaning head of the broom, with the longitudinal axis of the handle parallel to the length dimension or longitudinal axis of the cleaning head. The bracket can be readily removed and converted to retain the handle in a cleaning use mode. Use of the bracket in this manner forms an immovable connection which prevents the handle from coming loose from the cleaning head joint with the handle, supplies an extra measure of stability to the broom at its handle/cleaning head joint, and provides the handle additional strength to prevent handle breakage.

U.S. Pat. No. 5,890,254 relates to a hand manipulated implement including an implement head, a handle and a connector rigidly connecting the handle to the implement head. The connector includes a plug which is inserted into the handle and which includes an exposed end for inserting into a collet base defined on the implement head. The connector plug and collet base each include an aperture wherein the apertures of the plug and base are aligned by ribs cooperating with grooves and slots at the lower ends of the plug and collet base. A clip is inserted through the aligned apertures to thereby hold the handle against longitudinal movement relative to the collet base. In addition, a collet is formed at an upper end of the collet base for frictionally engaging the handle and thereby further limiting movement of the handle relative to the implement head.

U.S. Pat. No. 6,219,883 relates to an assembly for locking a handle to an implement head having convergent bores for mounting the handle. The assembly includes a handle mountable to one head bore with a transverse aperture located adjacent one end of the handle. A locking plug includes a locking pin. When the locking plug is mounted to the other head bore, the locking pin projects into the handle aperture, thereby locking the handle to the head. A flexible restraint may bridge the locking plug and handle.

U.S. Pat. No. 6,315,488 relates to a coupling device for connecting a handle part and a tool part includes a plug and a socket. The plug has a main portion, an end portion, and a notched portion between the main portion and the end portion. The socket has a proximal base end, a body portion, and a locking member. The body portion extends from the base end and has an axial, plug receiving bore that opens through a distal end of the body portion. The locking member is positioned between the base end and the plug receiving bore. The locking member includes a leaf spring cantilevered axially on one side of the body portion of the socket. The leaf spring supports a latch bar that engages the notched portion of the plug when the plug is inserted through the open end of the plug receiving bore. The latch bar is spaced from the leaf spring so that the end portion of the plug passes between the latch bar and the leaf spring when the plug is inserted through the open end of the plug receiving bore. The latch bar is released from the notched portion of the plug when the leaf spring is depressed inwardly from the one side of the socket body.

U.S. Publication No. 2005/0254887 relates to a locking mechanism for releasably coupling a generally cylindrical shaft to an item. The locking mechanism may be formed from a body having a cavity for receiving a shaft. The cavity may have an inner diameter that is slightly larger than an outside diameter of the shaft for producing a tight fit. The locking mechanism may also include an inner housing positioned in the cavity. The inner housing may include an internal cavity for receiving a locking device. The locking device may include one or more pins biased towards an outer surface of the inner housing. The pin may protrude through a hole in the inner housing and a hole in the body of the locking mechanism.

U.S. Publication No. 2007/0180639 relates to a block that includes a first and second bore on a first side. The first and second bores may converge. A handle may be inserted into the first bore. A securing element may be inserted into the second bore until it makes contact with the handle and when installed can limit rotation of the handle with respect to the block. When desired, the securing element can be removed and the handle can be removed from the block and position in the second bore. The securing element may be reinstalled in the first bore and again limit rotation of the handle with respect to the block.

U.S. Pat. No. 7,357,593 relates to a tube connector for connecting one tubular section to another tubular section. A hook apparatus is joined to a first tubular section and a latching apparatus joined to a second tubular section. The latching apparatus of the second tubular section removably engages the hook apparatus of the first tubular section forming a sturdy joint able to hold up under vigorous activity. The latch and hook are joined and locked into place. The second tubular section covers the engaged latch and hook joint.

In view of the above, the art still needs reliable locking devices for preventing separation between a handle shaft and a tool body.

SUMMARY OF THE INVENTION

The problems of the prior art described above and others are overcome with the locking devices of the present invention which include a locking mechanism having a key that is selectively mateable in a keyhole formed in a handle shaft, with the locking mechanism being operatively connected to the tool body. The locking device provides an apparatus which locks the handle shaft and tool body together when assembled.

In all embodiments or aspects of the invention, the handle shaft is secured to the tool body with the locking mechanism so that no rotational or axial movement of the handle shaft in relation to the tool body is possible. While the invention allows the handle shaft to be securely fastened to the tool body, due to the construction of the locking mechanism, the handle shaft can be easily and quickly removed from the tool body by moving the locking mechanism out of a locking position.

In one aspect a locking device for connecting a handle shaft to a tool body is disclosed, comprising a handle shaft having a longitudinal length, with a longitudinal axis between a first end and a second portion of the handle shaft, wherein the first end of the shaft is substantially cylindrical and externally threaded, wherein the first end of the shaft further includes a keyhole recessed into the shaft, a tool body having a threaded bore that is mateable with the threads of the handle shaft, the threaded bore having an outer rim, wherein the tool body has a keyway spaced from the outer rim that provides an additional access location to the threaded bore, a locking mechanism having a body having a key mateable in the keyhole of the handle shaft, wherein the locking mechanism is hingedly connected at a first end to the tool body such that the key can be moved between a first position whereby the key is not situated in the bore and keyhole and a second position where the key is located in the keyhole, wherein when the key is located in the keyhole, the handle shaft is prevented from rotating about the longitudinal axis, and wherein when the key is not located in the keyhole, the handle shaft is rotatable about the longitudinal axis allowing the handle shaft to be removed from the tool body.

In a further aspect, the locking mechanism body includes a hinge arm or hinge socket and the tool body has a complimentary tool arm or tool socket mated with the respective hinge arm or hinge socket to selectively provide mating between the key and keyhole.

In still another aspect, the key rotates in an arc about a rotational axis of the hinge arm or hinge socket.

In yet another aspect, the locking mechanism body includes the hinge arm and the tool body includes the tool socket, wherein a pair of hinge arms are present and located on opposing sides of the locking mechanism body.

In a further aspect, the tool body keyway is sized to accommodate at least a portion of the locking mechanism, and wherein the keyway includes the tool sockets.

In still another aspect, the key extends outwardly from a surface of the locking mechanism body.

In yet another aspect, the key is a projection having a height greater than a width, and wherein the keyhole has a height greater than a width.

In a further aspect, the tool body keyway has a sidewall including a latch bore, wherein the locking mechanism includes a latch arm flexibly connected to the body of the locking mechanism, and wherein the latch arm is mateable with the sidewall including a latch bore.

In still another aspect, the latch arm is located on an upper surface of the locking mechanism body.

In yet another aspect, the key extends laterally outward from a sidewall of the locking mechanism body.

In still another aspect, the latch arm is located on an upper surface of the locking mechanism body, and wherein the key extends laterally outward from a sidewall of the locking mechanism body.

In yet another aspect, each of the hinge arms are resiliently connected to the locking mechanism body.

In still another aspect, the keyhole is located in the threaded area of the handle shaft.

In yet another aspect, a method for connecting a handle shaft to a tool body is disclosed, comprising the steps of: obtaining a handle shaft having a longitudinal length, with a longitudinal axis between a first end and a second portion of the handle shaft, wherein the first end of the shaft is substantially cylindrical and externally threaded, wherein the first end of the shaft further includes a keyhole recessed into the shaft, mating a tool body having a threaded bore with the threads of the handle shaft, the threaded bore having an outer rim, wherein the tool body has a keyway spaced from the outer rim that provides an additional access location to the threaded bore, wherein a locking mechanism is hingedly connected at a first end to the tool body, wherein the locking mechanism has a body having a key mateable in the keyhole of the handle shaft, and manipulating the locking mechanism from a first position whereby the key is not situated in the bore and keyhole and a second position where the key is located in the keyhole, wherein when the key is located in the keyhole, the handle shaft is prevented from rotating about the longitudinal axis, and wherein when the key is not located in the keyhole, the handle shaft is rotatable about the longitudinal axis allowing the handle shaft to be removed from the tool body.

In a further aspect, the locking mechanism body includes a hinge arm or hinge socket and the tool body has a complimentary tool arm or tool socket mated with the respective hinge arm or hinge socket to selectively provide mating between the key and keyhole, and further including the step of rotating the key and an arc about a rotational axis of the hinge arm or hinge socket.

In another aspect, the locking mechanism body includes the hinge arm and the tool body includes the tool socket, wherein a pair of hinge arms are present and located on opposing sides of the locking mechanism body.

In still another aspect, the tool body keyway has a sidewall including a latch bore, wherein the locking mechanism includes a latch arm flexibly connected to the body of the locking mechanism, and wherein the latch arm is mateable with the sidewall including a latch bore, wherein the latch arm is located on an upper surface of the locking mechanism body, and further including the step of mating the latch arm sidewall including the latch bore.

For the avoidance of doubt, it is understood that while various embodiments or aspects of the invention are described individually, it should be clear that two or more embodiments or aspects can, and oftentimes are present in a single device according to the present invention.

BRIEF DESCRIPTION OF THE DRAWINGS

The invention will be better understood and other features and advantages will become apparent by reading the detailed description of the invention, taken together with the drawings, wherein.

DETAILED DESCRIPTION OF THE INVENTION

Figure 1:
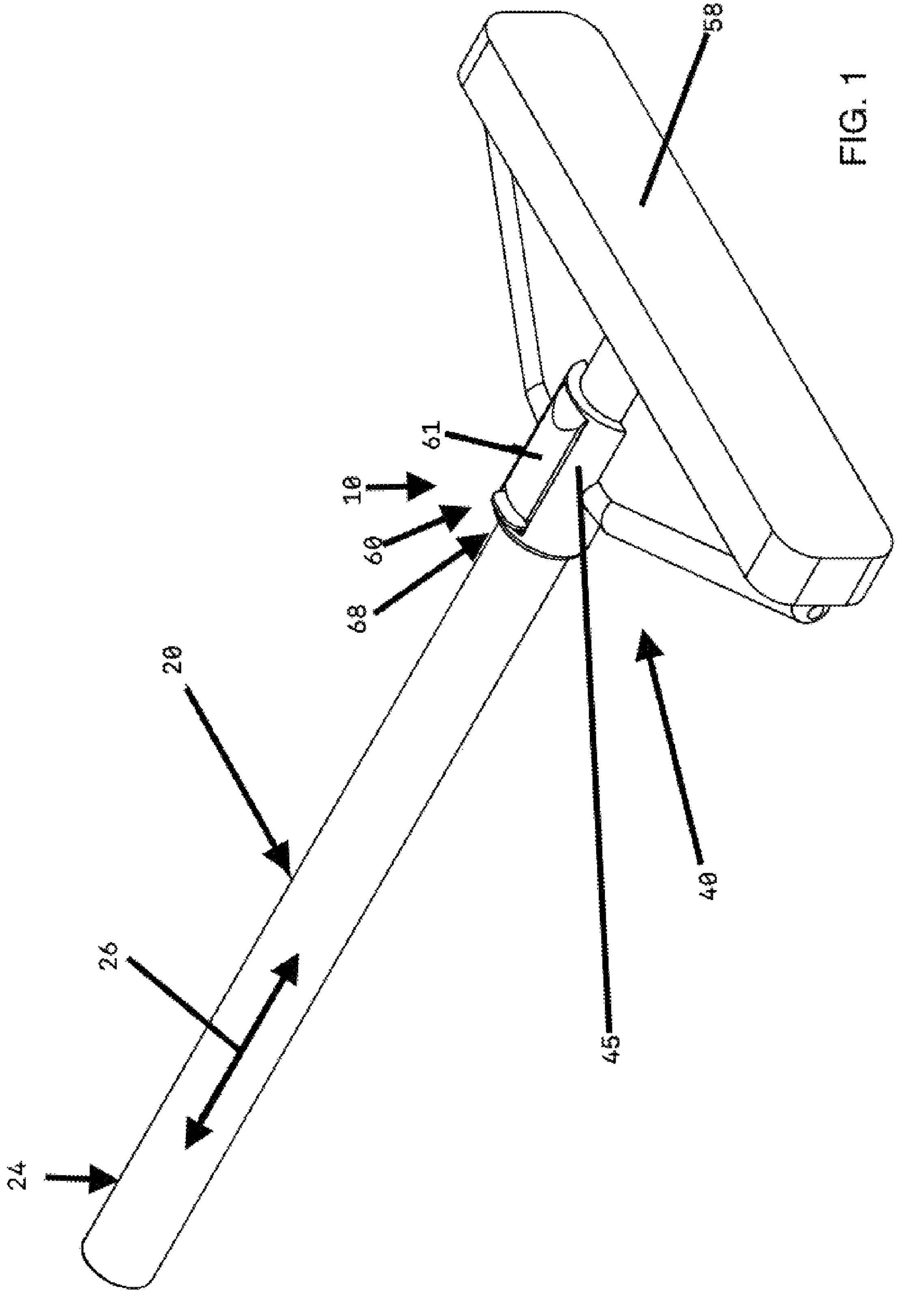
FIG. 1 is a perspective view of one embodiment of a locking device according to the invention showing a handle shaft having a lower end disposed in a tool body having a bore with the locking mechanism shown in a locked position.

This description of preferred embodiments is to be read in connection with the accompanying drawings, which are part of the entire written description of this invention. In the description, corresponding reference numbers are used throughout to identify the same or functionally similar elements. Relative terms such as "horizontal," "vertical," "up," "upper", "down," "lower", "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and are not intended to require a particular orientation unless specifically stated as such. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship.

Referring now to the drawings, wherein like reference numbers represent like or similar parts throughout the several views. FIGS. 1, 2, 3B and 3C show one embodiment of a locking mechanism 10 of the present invention which is adapted to secure handle shaft 20 to tool body 40 using locking mechanism 60 so that rotation of the handle shaft 20 about a longitudinal axis 26 thereof in relation to the tool body 40 is prevented by the locking mechanism 60 when engaged with handle shaft 20.

Handle Shaft

Handle shaft 20 as illustrated in FIGS. 1, 2, 3A and 3C includes a first end 22 and a second portion 24, which can be a second end of the handle shaft 20 when the handle shaft is straight. Longitudinal axis 26 extends between first end 22 and at least second portion 24. It is to be understood that the handle shaft 20 can be constructed having a large variety of sizes, shapes and compositions which generally depend upon an end use of the tool.

Figure 2:
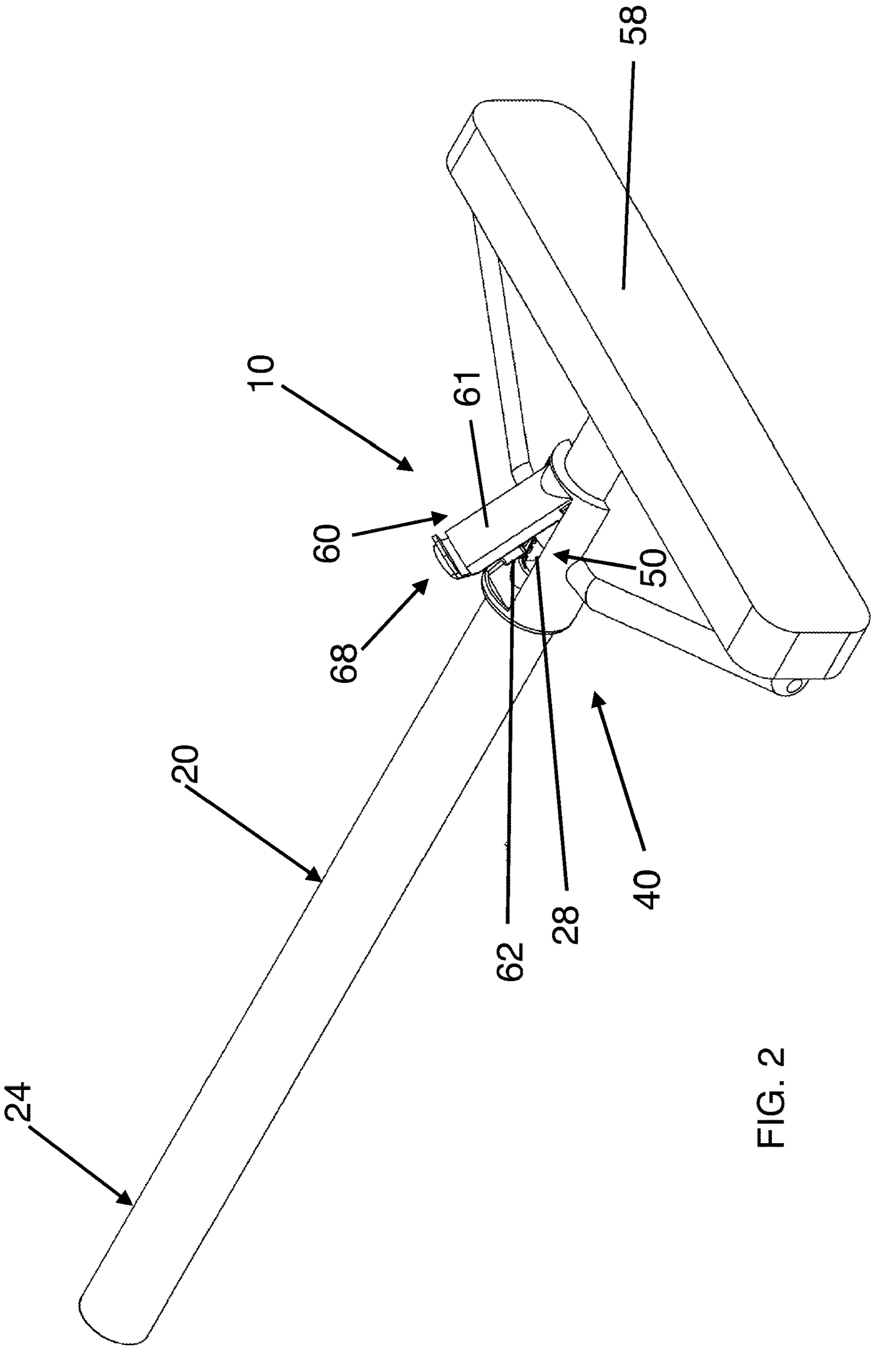
FIG. 2 is a perspective view of one embodiment of a locking device according to the invention showing a handle shaft disposed in the tool body bore with the locking mechanism shown in an unlocked position, wherein the handle shaft keyhole is vertically aligned with the key of the locking mechanism.
Figure 3A:
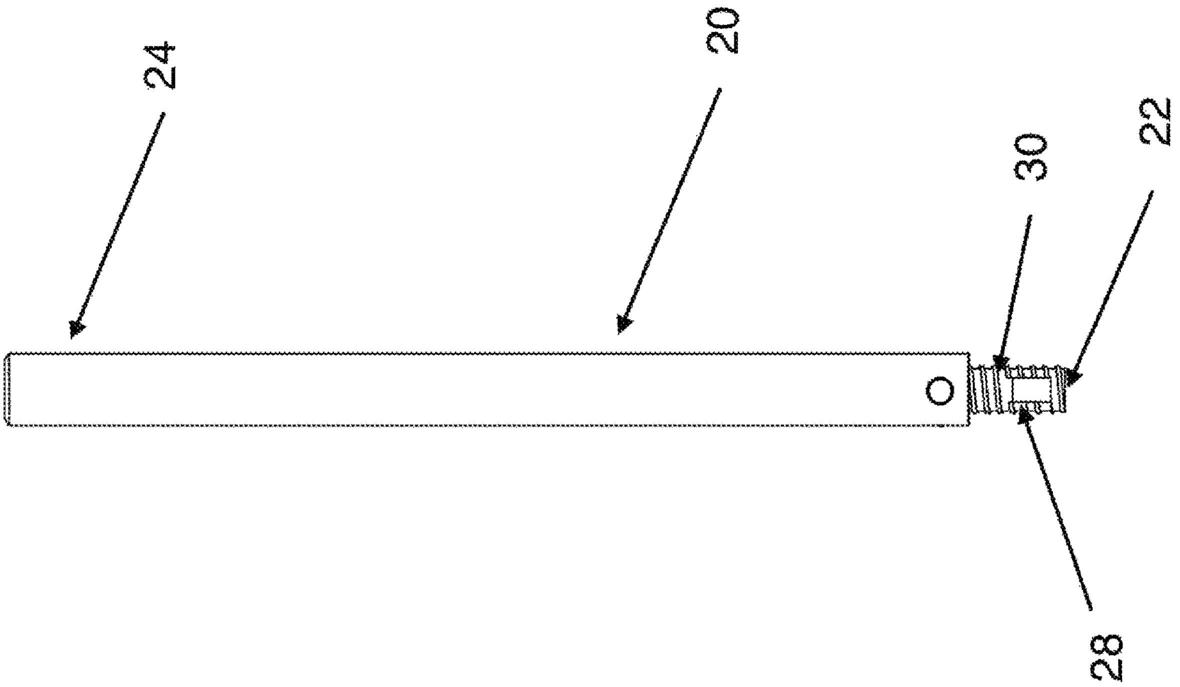
FIG. 3A is a front view of a handle shaft having a vertically oriented keyhole located in a threaded section of the shaft.
Figure 3B:
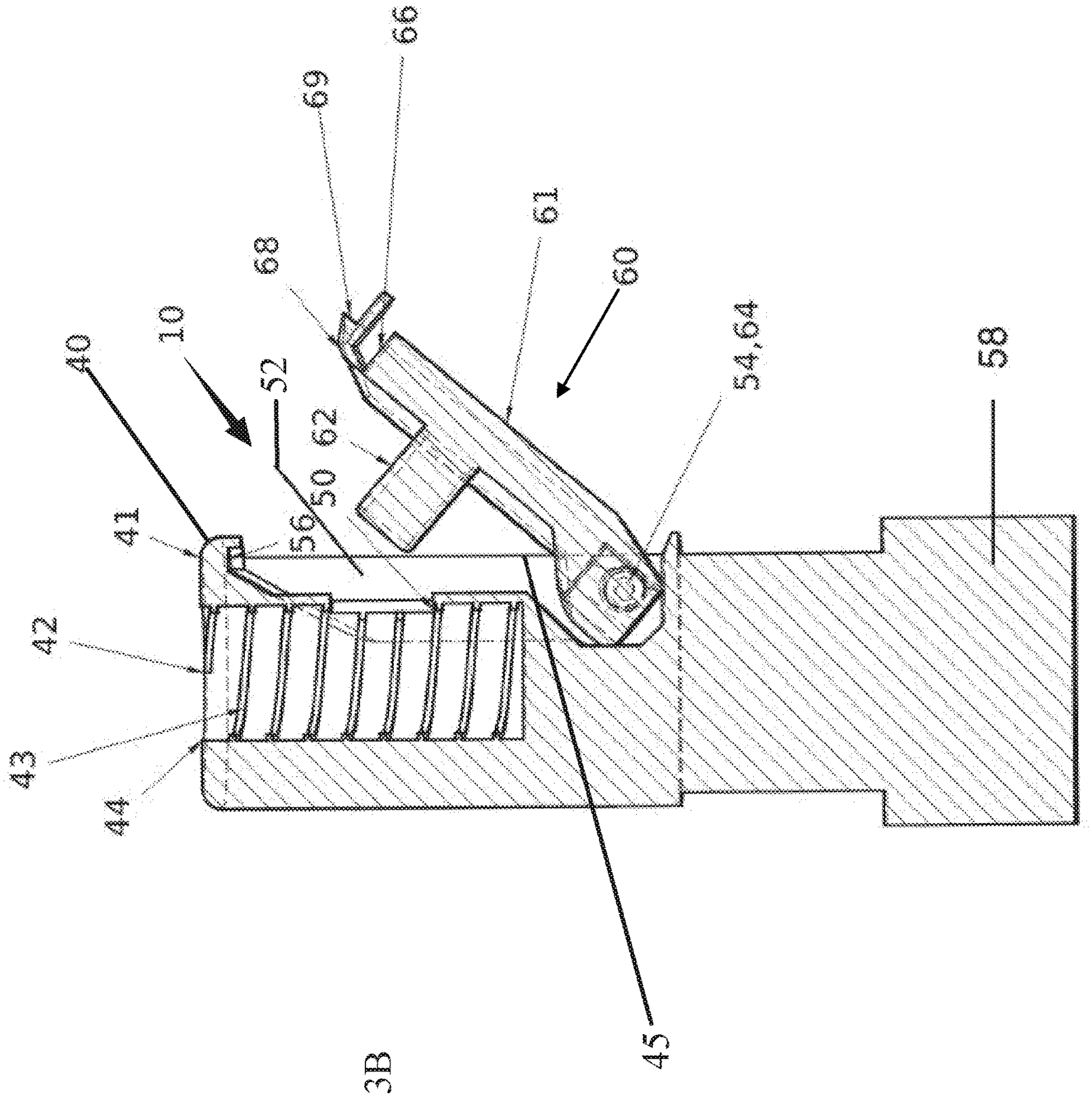
FIG. 3B is a side view of the a tool body and the locking mechanism connected thereto, with the locking mechanism shown in an unlocked position.
Figure 3C:
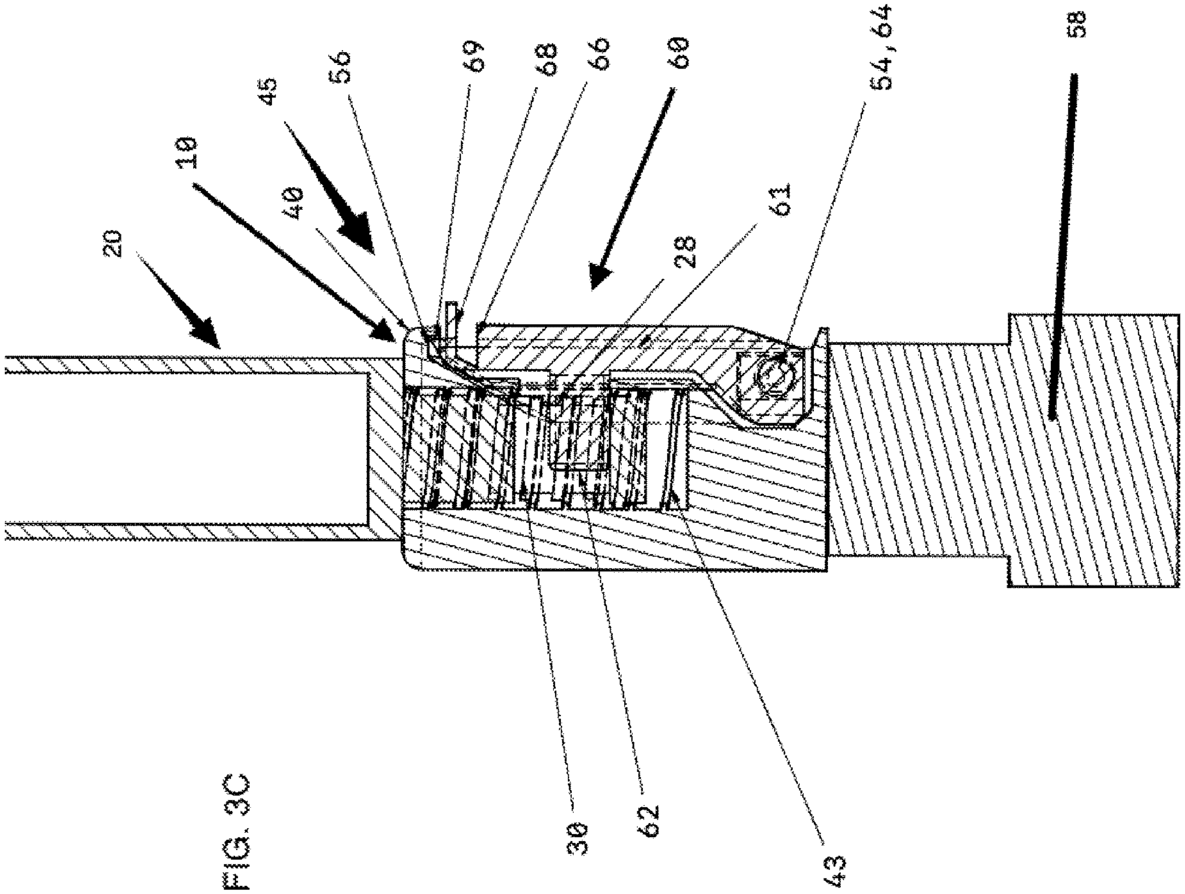
FIG. 3C is a side view of the handle shaft shown in FIG. 3A threaded into the tool body, wherein the locking mechanism is shown in the locked position with the key to the locking mechanism being disposed in the keyhole of the handle shaft.

The first end 22 of handle shaft 20 further includes a keyhole 28 recessed into the handle shaft. The keyhole illustrated in FIGS. 2, 3A and 3C is a vertical recess. However, it is to be understood that the keyhole can have any desired shape and size so long as the keyhole 28 of the shaft and key 62 of the locking mechanism cooperate to secure the handle shaft against rotational movement in relation to the tool body 40. Examples of other suitable keyhole shapes include, but are not limited to, cubes, rectangular prisms, spheres, hemispheres, cylinders, semi-cylinders or generally any other geometric or non-geometric form, and combinations thereof.

The first end 22 of handle shaft 20 is substantially cylindrical and preferably cylindrical. Threads 30 are formed or are otherwise present on the outer surface of handle shaft 20. In a preferred embodiment, the keyhole 28 is formed in a threaded area of the handle shaft. That said, in other embodiments, the keyhole 28 can be present in an area above the threads 30, and thus located further away from first end 22 of handle shaft 30.

Tool Body

Tool body 40 comprises an upper or face surface 41 including a bore 42 which is threaded, with threads 43, and mateable with the threads 30 of handle shaft 20. Threaded bore 42 includes an outer rim 44. Bore 42 extends a sufficient depth within the tool body 40 such that handle shaft 20 can be secured thereto. Bore depth depends upon factors including, but not limited to, composition of the handle shaft 20 and tool body 40 for example. Tool body 40 includes a keyway 50 that is separate and distinct from bore 42. Keyway 50 can be on the same face surface 41 or a different face surface, for example face surface 45 as illustrated in FIGS. 1, 3B and 3C. Keyway 50 is spaced from the outer rim 44 and provides an additional access point to threaded bore 42. Keyway 50 is sized appropriately to house locking mechanism 60 or a portion thereof as desired.

As explained further herein and below, keyway 50 includes one or more sidewalls 52. At least one of the sidewalls includes a tool arm or tool socket 54 which cooperates with a respective hinge socket or hinge arm 64 of locking mechanism 60 which is described further below.

A latch bore 56 is present in tool body 40 in order to secure locking mechanism 60 in a locking position. In an alternative embodiment, the latch bore can be a latch projection extending outwardly from sidewall 52 in order to secure locking mechanism 60 in the locking position.

Tool body 40 includes working end 58 located on the bottom surface thereof. It is to be understood that the tool itself can be any useful article such as, but not limited to, broom, brush, hoe, mop, pain roller, rake, shovel or stall pick.

Locking Mechanism

Figure 4:
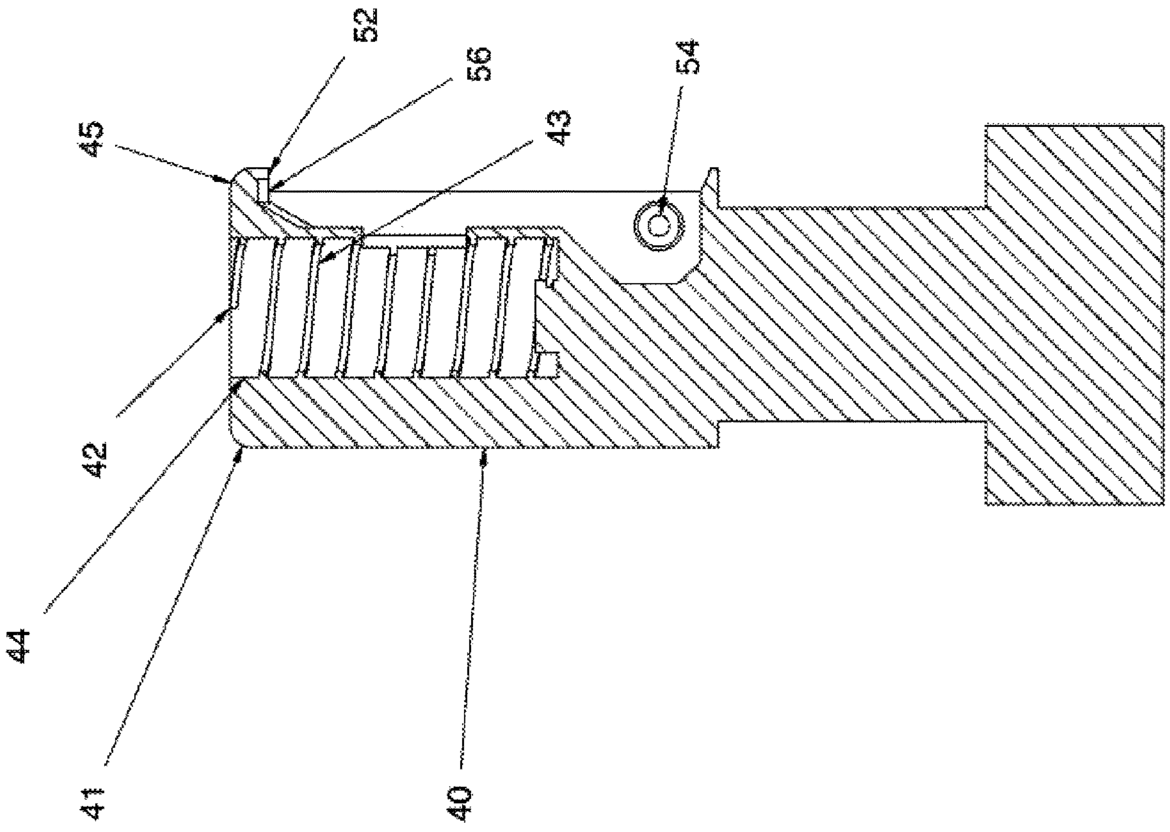
FIG. 4 is a cross-sectional side view of one embodiment of a portion of a tool body of the present invention.
Figure 5:
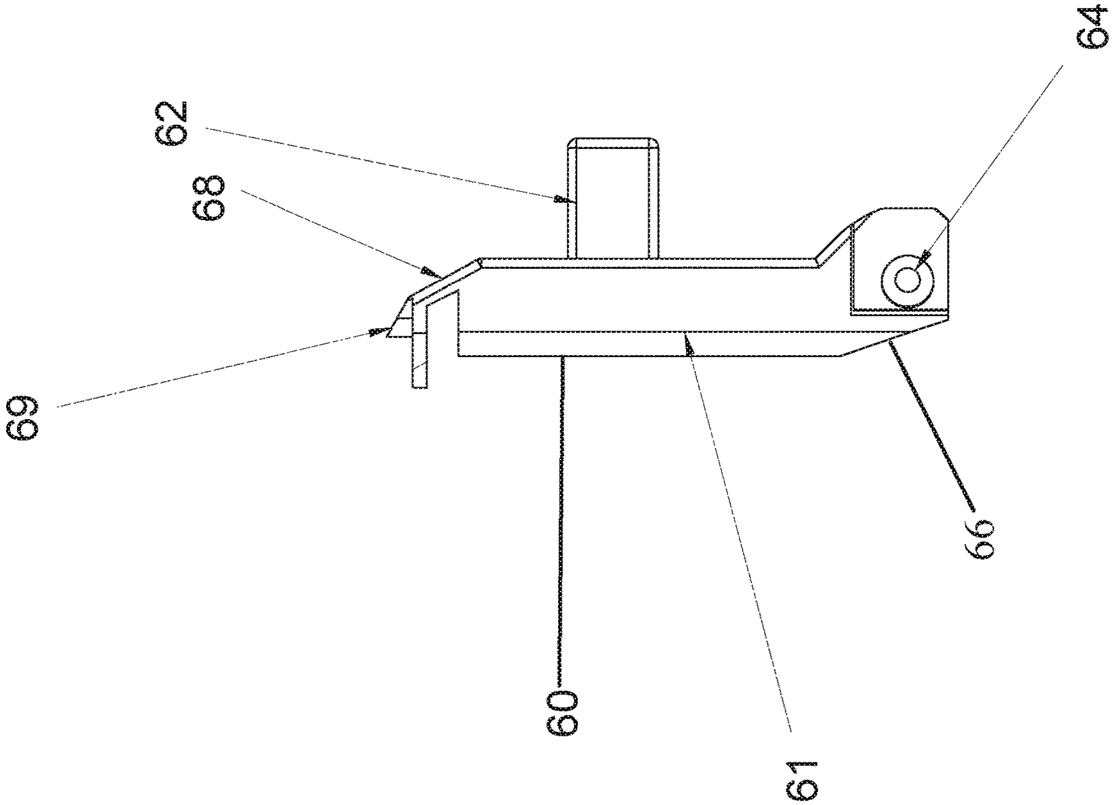
FIG. 5 is a side view of one embodiment of a locking mechanism of the present invention.
Figure 6:
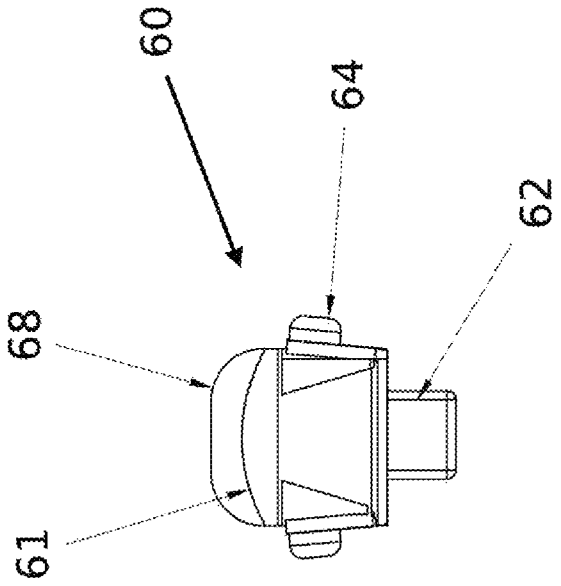
FIG. 6 is a top view of the locking mechanism shown in FIG. 5.
Figure 7:
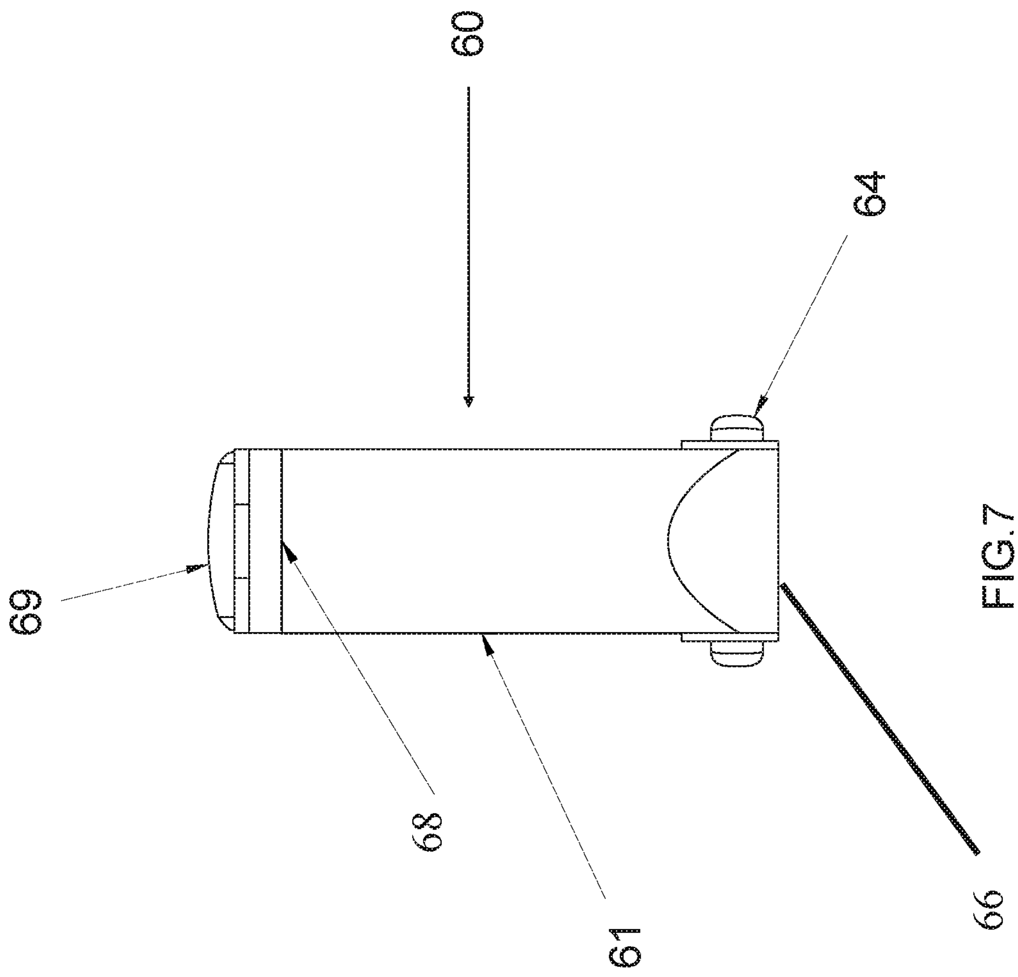
FIG. 7 is a rear view of the locking mechanism illustrated in FIG. 5.

Locking mechanism 60 has a body 61 having a key 62 mateable in the keyhole 28 of handle shaft 20. The locking mechanism is hingedly connected at a first end 66 to the tool body 40 such that the key 62 can be moved between a first position, as illustrated in FIGS. 2 and 3B whereby the key 62 is not situated in the bore 42, tool body 40 and keyhole 28 of handle shaft 20 and a second position as shown in FIGS. 1, 3C and 4, where the key is located in the keyhole. When the key is located in the keyhole, the handle shaft is prevented from rotating about the longitudinal axis 26. When the key is not located in the keyhole, the handle shaft is rotatable about the longitudinal axis thereby allowing the handle shaft to be removed from the tool body.

Locking mechanism 60 is hingedly connected to tool body 40 in a preferred embodiment by an arm and socket arrangement in one embodiment, with an arm of the locking mechanism being rotatable within the socket. For example, as shown in the figures, the locking mechanism body 61 includes a hinge arm 64 and the tool body 40 has a complimentary tool socket 54 operatively connected to the hinge arm to selectively provide mating between the key and keyhole. As illustrated, a pair of hinge arms 64 are located on opposing sides of the locking mechanism body 61 and each fit in a separate tool socket 54 on opposite sidewalls 52 of keyway 50.

In a preferred embodiment the hinge arms 64 are resiliently connected to hinge body 61. In order to connect the locking mechanism 60 to the tool body 40, the hinge arms 64 are compressed and aligned with tool socket 54. Thereafter, they are allowed to reexpand and provide the fitted, rotatable connection within tool socket 54.

As described hereinabove, the opposite arrangement could readily be utilized wherein the hinge socket is located in the locking mechanism 60 and a tool arm can be located in a sidewall 52 of keyway 50. Other connection arrangements between the locking mechanism 60 and tool body 40 can alternatively be utilized so long as the arrangement allows key 62 to be selectively located in keyhole 28 of handle shaft 20.

In the embodiment illustrated in FIGS. 1, 2, 3B and 3C, the key 62 of locking mechanism 60 rotates in an arc about a rotational axis extending through the hinge arm 64 and tool socket 54.

Key 62 extends outwardly from at least one surface of locking mechanism body 61. The key 62 is a projection. The projection illustrated in FIGS. 1, 2, 3B, 3C, 5 and 6 is a rectangular prism which mates with keyhole 28 recessed in handle shaft 20. The rectangular prism illustrated has a height greater than a width and keyhole 28 also has a height greater than a width thereof. Key 62 can assume other shapes which include, but are not limited to, cubes, spheres, hemispheres, cylinders, semi-cylinders or any other geometric or non-geometric form, and combinations thereof. The only requirement regarding the shape of the key is that the same when engaged in keyhole 28 prevents the handle shaft from rotating about the longitudinal axis of the handle shaft.

In the embodiment illustrated, key 62 extends laterally outward from a sidewall of locking mechanism body 61.

Locking mechanism 60 in one embodiment includes a latch arm 68 flexibly and/or resiliently connected to body 61 of the locking mechanism. The latch arm is mateable with a portion of keyway 50, preferably a sidewall 52 in some embodiments, wherein the sidewall includes latch bore 56. In FIGS. 1, 2, 3B, 3C, 5 and 7 latch arm 68 is shown located on an upper surface of locking mechanism body 61. Latch arm 68 includes a projection 69 which mates with latch bore 56.

Methods of Use

In order to secure a handle incorporating handle shaft 20 to the locking device 10 of the present invention, the first end 22 of the handle shaft is threaded into bore 42 of tool body 40. Once the handle shaft has been inserted to a sufficient depth, the keyhole 28 is aligned with key 62 of locking mechanism 60 such as shown in FIGS. 3B and 3C. Locking mechanism 60 is then manipulated so that the key rotates in an arc about the rotational axis of the hinge arm and tool socket combination. Latch arm 68 is pushed downwardly towards the top surface of the body 61 so that projection 69 can clear and be inserted into latch bore 56 after which the latch arm 68 is released. During the process, the key 62 is inserted into keyhole 28 whereby handle shaft 20 is prevented from rotating about the longitudinal axis 26 of handle shaft 20. Latch arm 68 and locking mechanism 60 can be released from handle shaft 20 by depressing the latch arm to remove projection 69 from latch bore 56 whereafter the locking mechanism can be rotated outwardly such that the key 62 is removed from keyhole 28.

In accordance with the patent statutes, the best mode and preferred embodiment have been set forth; the scope of the invention is not limited thereto, but rather by the scope of the attached claims.

What is claimed is:

1. A locking device for connecting a handle shaft to a tool body, comprising:

a handle shaft having a longitudinal length, with a longitudinal axis between a first end and a second portion of the handle shaft, wherein the handle shaft is adapted to be formed or provided with a grip for a user to manipulate the tool body, wherein the first end of the shaft is substantially cylindrical and externally threaded, wherein the first end of the shaft further includes a keyhole recessed into the shaft, a tool body having a threaded bore that is mateable with the threads of the handle shaft, the threaded bore having an outer rim, wherein the tool body has a keyway spaced from the outer rim that provides an additional access location to the threaded bore, a locking mechanism having a body having a key mateable in the keyhole of the handle shaft, wherein the locking mechanism is hingedly connected at a first end to the tool body such that the key can be moved between a first position whereby the key is not situated in the threaded bore of the tool body and keyhole of the handle shaft and a second position where the key is located in the keyhole, of the handle shaft wherein when the key is located in the keyhole, the handle shaft is prevented from rotating about the longitudinal axis, and wherein when the key is not located in the keyhole, the handle shaft is rotatable about the longitudinal axis allowing the handle shaft to be removed from the tool body.

2. The locking device according to claim 1, wherein the locking mechanism body includes a hinge arm or hinge socket and the tool body has a complimentary tool arm or tool socket mated with the respective hinge arm or hinge socket to selectively provide mating between the key and keyhole.

3. The locking device according to claim 2, wherein the key rotates in an arc about a rotational axis of the hinge arm or hinge socket.

4. The locking device according to claim 3, wherein the locking mechanism body includes the hinge arm and the tool body includes the tool socket, wherein a pair of hinge arms are present and located on opposing sides of the locking mechanism body.

5. The locking device according to claim 4, wherein the tool body keyway is sized to accommodate at least a portion of the locking mechanism, and wherein the keyway includes the tool sockets.

6. The locking device according to claim 5, wherein the tool body keyway has a sidewall including a latch bore, wherein the locking mechanism includes a latch arm flexibly connected to the body of the locking mechanism, and wherein the latch arm is mateable with the sidewall including the latch bore.

7. The locking device according to claim 6, wherein the latch arm is located on an upper surface of the locking mechanism body, and wherein the key extends laterally outward from a sidewall of the locking mechanism body.

8. The locking device according to claim 4, wherein each of the hinge arms are resiliently connected to the locking mechanism body.

9. The locking device according to claim 7, wherein each of the hinge arms are resiliently connected to the locking mechanism body.

10. The locking device according to claim 1, wherein the key extends outwardly from a surface of the locking mechanism body.

11. The locking device according to claim 10, wherein the key is a projection having a height greater than a width, and wherein the keyhole has a height greater than a width.

12. The locking device according to claim 1, wherein the tool body keyway has a sidewall including a latch bore, wherein the locking mechanism includes a latch arm flexibly connected to the body of the locking mechanism, and wherein the latch arm is mateable with the sidewall including a latch bore.

13. The locking device according to claim 12, wherein the latch arm is located on an upper surface of the locking mechanism body.

14. The locking device according to claim 13, wherein the key extends laterally outward from a sidewall of the locking mechanism body.

15. The locking device according to claim 1, wherein the keyhole is located in the threaded area of the handle shaft.

16. A method for connecting a handle shaft to a tool body, comprising the steps of:

obtaining a handle shaft having a longitudinal length, with a longitudinal axis between a first end and a second portion of the handle shaft, wherein the first end of the shaft is substantially cylindrical and externally threaded, wherein the first end of the shaft further includes a keyhole recessed into the shaft, mating a tool body having a threaded bore with the threads of the handle shaft, the threaded bore having an outer rim, wherein the tool body has a keyway spaced from the outer rim that provides an additional access location to the threaded bore, wherein a locking mechanism is hingedly connected at a first end to the tool body, wherein the locking mechanism has a body having a key mateable in the keyhole of the handle shaft, and manipulating the locking mechanism from a first position whereby the key is not situated in the threaded bore of the tool body and keyhole of the handle shaft and a second position where the key is located in the keyhole of the handle shaft, wherein when the key is located in the keyhole, the handle shaft is prevented from rotating about the longitudinal axis, and wherein when the key is not located in the keyhole, the handle shaft is rotatable about the longitudinal axis allowing the handle shaft to be removed from the tool body.

17. The method according to claim 16, wherein the locking mechanism body includes a hinge arm or hinge socket and the tool body has a complimentary tool arm or tool socket mated with the respective hinge arm or hinge socket to selectively provide mating between the key and keyhole, and further including the step of rotating the key and an arc about a rotational axis of the hinge arm or hinge socket.

18. The method according to claim 17, wherein the locking mechanism body includes the hinge arm and the tool body includes the tool socket, wherein a pair of hinge arms are present and located on opposing sides of the locking mechanism body.

19. The method according to claim 18, wherein the tool body keyway has a sidewall including a latch bore, wherein the locking mechanism includes a latch arm flexibly connected to the body of the locking mechanism, and wherein the latch arm is mateable with the sidewall including a latch bore, wherein the latch arm is located on an upper surface of the locking mechanism body, and further including the step of mating the latch arm sidewall including the latch bore.

* * * * *